UNITED STATES PATENT OFFICE.

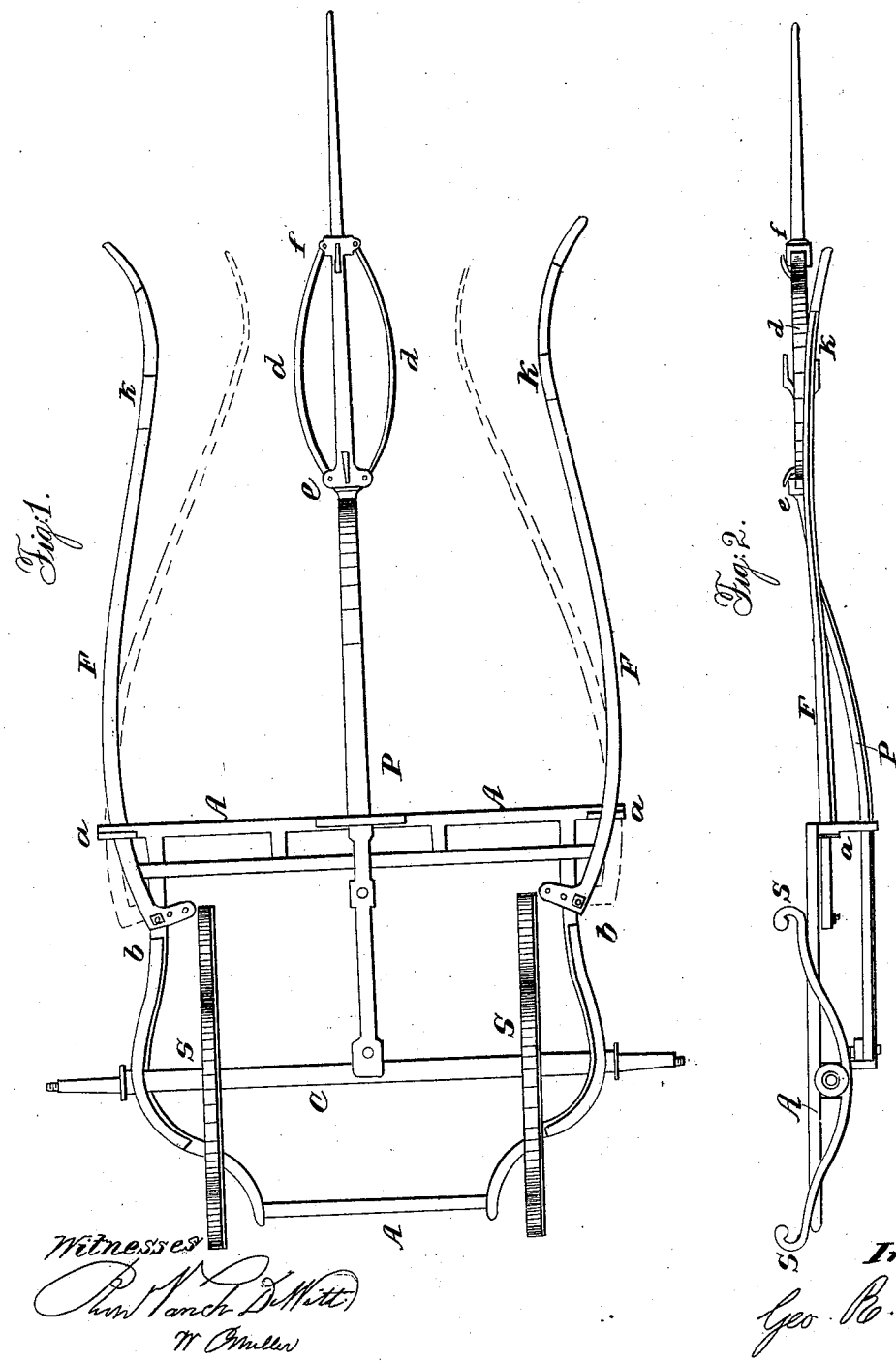

GEO. R. COMSTOCK, OF MANHEIM, NEW YORK.

CARRIAGE.

Specification of Letters Patent No. 12,272, dated January 23, 1855.

*To all whom it may concern:*

Be it known that I, GEORGE R. COMSTOCK, of Manheim, Herkimer county, State of New York, have invented a new Method of Arrangement and Construction for Carriage-Shafting, which I call "Comstock's Carriage-Shafting"; and I declare the following specification, with the drawings attached hereto as part of the same, to be a full and perfect description thereof.

Figure 1 represents a plan of the improved shafting the entire structure being shown in reverse as seen from below. Fig. 2 is a profile of the same.

Similar letters in both figures referring to the same parts of the apparatus.

A, A, A, is the lower framing for a two wheeled or for the fore axles of a four wheeled carriage; C, the axle; S, the springs; F, the thills and P the pole.

The usual method of constructing such carriages, as it may be desirable to have drawn sometimes by one, sometimes by two horses; is to arrange the shafting so, that the thills can at any time be removed and a pole substituted for them.

My first improvement consists in arranging for the employment of thills and pole at the same time when using a span of horses. In order to do this whenever it may be necessary I construct the front bars of the framing A A wider than usual so as to have room enough between their outer ends for a span of horses. The thills F, F, pass through loops or staples $a$, $a$, which hang down from the extremity of the front bar. The rear end of the thills extend some 12 or 15 inches back to the side framing at $b$, where they turn inward with a circular arc at right angles to their line of direction, this latter part being pierced with two or more bolt holes, through either of which and a corresponding hole in the frame, a bolt is passed to secure the thill. It will be perceived from the drawings, the loop $a$ acts as a fulcrum and that as the one or the other of these holes is used for the bolt, will the space between the thills be enlarged or diminished at will.

The pole P is attached to the frame in the manner shown in the drawing or in any other convenient manner. Opposite that part of the thills at $k$ to which the hold back hooks are attached, the pole has affixed a pair of elliptic-springs $d$, $d$, the sockets or attachments of which $e$ and $f$ allow them a rotary motion round the pole, the socket $e$ being secured so as to have no motion along the pole, but $f$ being free to move in that direction and give to the springs free play. The springs have hold-back hooks attached to them corresponding with the hooks on the thills, so that straps passing around each horse attach the animal to the thill on one side and the spring on the other.

The practical advantages I have found to result from this mode of construction are the following: The yielding of the spring relieves the jerking motion of the pole as the horses sway sidewise in their gait. It also relieves the frame of the carriage from the strain occasioned by this motion, as well as the horses from jostling each other. The swiveling of the spring around the pole relieves the jerking and consequent strain of the harness upon the backs of the horses, as they rise and fall irregularly, from the unevenness of the road or dissimilarity in gait. The combination of thills with a pole, tends to prevent, to some extent, the oversetting of a carriage. With a pole alone, a carriage may be overturned, leaving the horses on their feet free to run away with the vehicle. But where the animals are strapped to a pole, and to thills also, the upsetting of the carriage insures the throwing down of the horses too, preventing their running away, besides which the resistance of the horses, through the medium of the harness, will materially aid in preserving the balance of the carriage.

The convenience of the arrangement of the thills so that when the pole is removed they can be adjusted, to the use of one horse, or to varying spaces for horses of different sizes, requires no comment.

I claim—

1. The employment of thills in combination with a pole, which pole has attached to it an elliptic spring, capable of a motion around the pole, to which spring, as well as to the thills the draft animals are to be attached by the harness, substantially as set forth in the within specification.

2. I also claim the arrangement of the thills, by which the space between them, can be enlarged or contracted to adapt it to one or two horses, as may be required, the same to be effected by a right angled elbow on the rear end of each thill having several bolt holes, through which it can be bolted to the framework of the carriage the thill turning as on a pivot in a loop attached to the outward extremity of the said framework substantially as set forth in the within specification.

3. Also the combination of the united thills pole and elliptic spring, with a carriage, for the purposes and in the manner substantially as set forth in the within specification.

GEO. R. COMSTOCK.

Witnesses:
  RCH. PATRICK DE WITT,
  W. C. MILLER.